(12) United States Patent
Hellmann et al.

(10) Patent No.: US 8,193,128 B2
(45) Date of Patent: Jun. 5, 2012

(54) TREATMENT OF PARTICLES FOR IMPROVED PERFORMANCE AS PROPPANTS

(75) Inventors: John R. Hellmann, State College, PA (US); Barry E. Sheetz, Lemont, PA (US); Ryan P. Koseski, Bethesda, MD (US)

(73) Assignee: The Penn State Research Foundation, University Park, PA (US)

( * ) Notice: Subject to any disclaimer, the term of this patent is extended or adjusted under 35 U.S.C. 154(b) by 8 days.

(21) Appl. No.: 12/801,579

(22) Filed: Jun. 15, 2010

(65) Prior Publication Data

US 2010/0326657 A1   Dec. 30, 2010

Related U.S. Application Data

(60) Provisional application No. 61/213,528, filed on Jun. 17, 2009.

(51) Int. Cl.
*C09K 8/60* (2006.01)
*C03C 15/00* (2006.01)
*E21B 43/267* (2006.01)

(52) U.S. Cl. ....... 507/269; 65/30.1; 65/30.13; 65/30.14; 166/280.2; 166/308.1

(58) Field of Classification Search .............. 507/269; 166/280.2, 308.1; 65/30.1, 30.13, 30.14
See application file for complete search history.

(56) References Cited

U.S. PATENT DOCUMENTS

| | | | |
|---|---|---|---|
| 3,573,020 A * | 3/1971 | Karstetter | 65/30.14 |
| 3,728,095 A * | 4/1973 | Grubb et al. | 65/30.14 |
| 4,068,718 A | 1/1978 | Cooke | |
| 4,101,460 A | 7/1978 | Small | |
| 4,537,911 A | 8/1985 | Chonde | |
| 4,654,266 A | 3/1987 | Kachnik | |
| 5,866,006 A | 2/1999 | Lihme | |
| 6,258,996 B1 | 10/2001 | Goldman | |
| 6,330,916 B1 | 12/2001 | Richards | |
| 6,579,947 B2 | 6/2003 | Heitz | |
| 6,767,868 B2 | 7/2004 | Dawson | |
| 6,991,852 B2 | 1/2006 | Carr | |
| 7,135,231 B1 | 11/2006 | Sinclair | |
| 7,268,100 B2 | 9/2007 | Kippie | |
| 7,398,826 B2 | 7/2008 | Hoefer | |
| 2005/0096207 A1 | 5/2005 | Urbanek | |
| 2006/0162926 A1 | 7/2006 | Roddy | |
| 2006/0272816 A1 | 12/2006 | Willberg | |
| 2007/0187146 A1 | 8/2007 | Wiley | |
| 2008/0119374 A1 | 5/2008 | Willberg | |
| 2008/0135245 A1 | 6/2008 | Smith | |
| 2010/0068521 A1 | 3/2010 | Koseski | |

OTHER PUBLICATIONS

International Search Report for PCT/US2010/001733.*

* cited by examiner

*Primary Examiner* — Timothy J. Kugel
(74) *Attorney, Agent, or Firm* — Law Offices John A. Parrish

(57) ABSTRACT

The disclosed invention relates to a process of using molten salt ion exchange to treat particles such as spherically shaped soda-lime-silica glass particles. The treated particles may be used as proppants in hydrofractured oil and natural gas wells.

22 Claims, 4 Drawing Sheets

United States Patent US 8,193,128 B2

TREATMENT OF PARTICLES FOR IMPROVED PERFORMANCE AS PROPPANTS

REFERENCE TO RELATED APPLICATIONS

This application claims priority to U.S. Provisional Patent Application 61/213,528 filed Jun. 17, 2009, now expired.

BACKGROUND OF THE INVENTION

The hydrofracturing process for stimulating oil/gas well production, also known as "hydrofracing", entails injecting a viscous hydraulic liquid (known in the industry as a "fracing pad") into a well to fracture the geologic strata and expose isolated beds of extractable material (usually hydrocarbons, oil, natural gas, etc.).

Following injection of the fracing pad, a water-based slurry of surfactants, acids and solid particles ("proppants") is added to the well to selectively clean and prop open fractures in the well. Proppants in the slurry remain in an appropriate location after the release of a fracturing pressure. With down well pressures often greater than 5000 pounds per square inch, cleaning and re-fracturing of wells incurring extremely high costs and the extractable materials back-flowing through the remaining proppants, the particulates must exhibit suitable strength, reliability and permeability Properties desirable in proppants include high strength and a high degree of sphericity to promote flow and dispersion of the proppants within the fracing pad. Other desirable properties include low specific gravity to mitigate settling of the proppants during placement of the fracing pad, as well as consistent failure behavior to accurately predict and promote well permeability.

A variety of materials have been used as proppants. These materials have included ground walnut hulls, Ottawa White Sand, high alumina content kaolin as well as bauxite ores. These materials have been employed in the form of large spherical particles (300 microns-2000 microns) diameter. Other materials that have been considered for use as proppants have included glass and/or glass-ceramic such as mixed glass cullet, metallurgical furnace slags, fly ashes, and mining operation by-products.

Glass spheres are an attractive candidate for use as proppants based on their commercial abundance, ease of manufacture, low cost, and high strength. Candidate materials that meet most of the proppant requirements are spheroidized glass manufactured from industrial byproduct waste streams such as mixed glass cullet, rhyolite, basalt, tholeiite, olivine and/or andesite. Such alternate minerals can include rhyolite, basalt, tholeiite and/or olivine having a nominal composition range in weight percent (wt %) of 49-59 $SiO_2$, 10-20 $Al_2O_3$, 0.5-4.5 $Fe_2O_3$, 3-13 FeO, 0-10 MgO, 0-16 CaO, 0-7 $Na_2O$, 0-4 $K_2O$, 0-4 $TiO_2$, 0-1 MgO, 0-1 $P_2O_5$ plus the presence of trace and/or minor quantities of other transition metal oxides, residual water and/or sulphates.

The utility of spherical glass particles as proppants, however, has been hampered by the tendency of the glass particles to fracture under loading into fine fragments that can "blind" the interstices between individual proppant particles, thereby resulting in decreased permeability and recovery of resources from the well.

A need therefore exists for glass and/or glass ceramic materials such as in the form of spherically shaped particles that overcome these undesirable physical behaviors.

SUMMARY OF THE INVENTION

Figure 1:
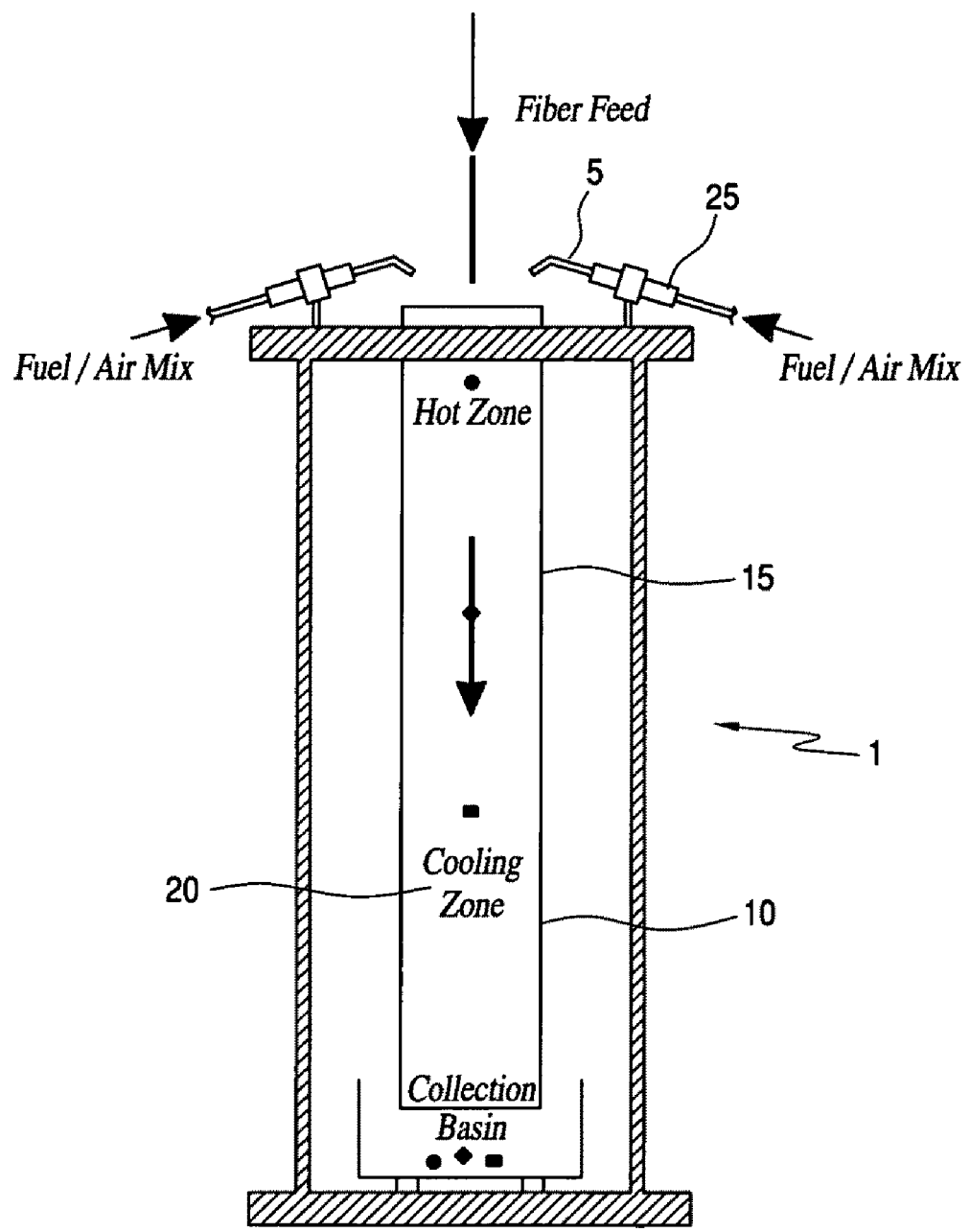
FIG. 1 is a schematic of a flame spheroidization tower.

A novel process for ion-exchange treatment of particles such as spherically shaped particles is disclosed. The ion exchange treated particles may be used as proppants in hydrofracturing of oil and natural gas wells. The ion exchange treated particles also may be used in operations such as abrasive media, reactive permeable barrier catalysts for water table remediation and carbon sequestration.

In a first aspect, the invention relates to a proppant having reduced generation of fines during failure. The proppant may be any one or more of soda-lime-silica glass particles, glass-forming alumino silicate particles and mixtures thereof. The particles may have a compressive stress state in the near surface region of the particle wherein the compressive stress state is formed by molten salt ion exchange between the particle and a molten salt may be any one or more of alkali salts, alkaline earth salts and mixtures thereof. The compressive stress state may be maximum in the near surface region of the particles and lessen across a desired thickness of the particles.

In a second aspect, the invention relates to a method of producing particles suitable for use as a proppant having reduced generation of fines during failure by a single stage ion exchange. The method entails treating particles to a molten salt at an elevated temperature for a time period to cause molten salt ion exchange between the molten salt and the particles to impart a desired residual stress state in the near surface region of particles wherein the particles may be any one or more of glass particles, glass-based particles and glass-forming aluminosilicate particles and the salt may be any one or more of alkali salts, alkaline earth salts and mixtures thereof.

In a third aspect, the invention relates to a method of producing particles suitable for use as a proppant having reduced generation of fines during failure by a multi-stage ion exchange. The method entails treating particles to a first molten salt at a first elevated temperature for a first time period to cause ion exchange between the molten salt and the particles to produce first exchanged particles having a desired residual stress state in the near surface region of the first exchanged particles wherein the particles are selected from the group consisting of glass particles, glass-based particles and glass-forming aluminosilicate particles, and treating the first exchanged particles to a mixture of molten salts for a second time period to generate second exchanged particles that have a graded stress profile a across a given thickness of the particles. In this aspect, the method may be used to generate a desired stress state such as a compressive stress stage in the particles wherein the compressive stress is maximum in the near surface region of the particles and lessens across a given thickness of the particles. The particles may be glass particles such as spherical soda-lime-silica glass particles. In this aspect, the first molten salt may be an alkali salt selected from group consisting of KCl, NaCl, BeCl$_2$, KNO$_3$, NaNO$_3$, LiNO$_3$ and the mixture of salts may be a mixture of alkali salts, a mixture of alkaline earth salts and mixtures thereof. The alkaline earth salts may be two or more of MgCl$_2$, SrCl$_2$, BaCl$_2$, Be(NO$_3$)$_2$, Mg(NO$_3$)$_2$, Sr(NO$_3$)$_2$, Ba(NO$_3$)$_2$, KNO$_3$ and mixtures thereof.

The residual stress state in the ion-exchanged particles may be tailored to vary in a desired fashion, such as in the form of a gradient. For example, the gradient may vary from compressive stress at the surface to tensile stress in the center of the ion-exchanged particle or vice-versa.

The ion exchange treated particles advantageously generate reduced amounts of fine fragments during failure under mechanical stress such as may be generated during multiaxial loading of a proppant assemblage in a hydrofractured well. The reduced fraction of fine fragments advantageously may enable reduced "blinding" of packed proppant beds, prolong fluid permeability and lengthen well production.

The ion-exchanged treated particles advantageously have consistent characteristic strengths, lower strength variability, and greater mechanical reliability under multiaxial loading than untreated particles.

DETAILED DESCRIPTION OF THE INVENTION

Definitions

As used herein, the term "fines" is understood to mean particles that have a size of about 150 microns or less.

As used herein, the term "near surface region" is understood to mean the region that extends from the surface of a particle to a depth of up to about 10% to about 20% of the radius of the particle.

As used herein, the term "spherical particle" is understood to include spheres and spheroidal shaped particles.

Materials

The spherically shaped particles, preferably spherical particles, employed herein may be formed from a wide variety of materials. Examples of these materials include but are not limited to alkali-alkaline earth-silica glass such as soda-lime-silica glass cullet such as that available as recycled container glass, E-glass, metallurgical furnace slag, fly ash, glass-forming alumino silicates such as andesite, rhyolite, basalt and mixtures thereof.

Soda-lime-silica glass cullet includes primary components of SiO$_2$, Na$_2$O and CaO and is preferred for use in the ion-exchange process of the invention. Soda-lime-silica glass has about 40 wt % SiO$_2$ to about 80 wt % SiO$_2$, preferably about 60 wt % SiO$_2$ to about 80 wt % SiO$_2$, about 1 wt % Na$_2$O to about 15 wt % Na$_2$O, preferably about 13 wt % Na$_2$O to about 15 wt % Na$_2$O, and about 1 wt % CaO to about 14 wt % CaO, preferably about 8 wt % CaO to about 10 wt % CaO where all amounts are based on the total weight of the glass composition.

In a preferred aspect, the soda-lime-silica based glass compositions have about 72 wt. % SiO$_2$ to about 64.5% SiO$_2$, about 13 wt. %, about 13 wt. % Na$_2$O to about 16.5 wt. % Na$_2$O, about 10 wt. % CaO to about 13.5 wt. % CaO, about 2 wt % Al$_2$O$_3$ to about 3.6 wt. % Al$_2$O$_3$, the balance being any one or more of K$_2$O, Fe$_2$O$_3$, MgO and SO$_3$, all amounts based on the total weight of the composition.

Soda-lime-silica glass compositions may include additional alkali oxides such as Li$_2$O and K$_2$O or mixtures thereof with Na$_2$O. Additional alkaline earth oxides such as MgO, BaO, SrO or mixtures thereof with CaO also may be present.

Also, oxide components such as Al$_2$O$_3$, B$_2$O$_3$, BaO, FeO, Fe$_2$O$_3$, P$_2$O$_5$, SnO, SnO$_2$, SrO, TiO$_2$, ZnO and mixtures thereof may be present in the soda-lime-silica glass compositions.

Process

The process entails molten salt ion exchange of particles, preferably spherically shaped particles, more preferably particles in the form of spheres of glass, glass-ceramic particles and mixtures thereof. Spherically shaped particles of soda-lime-silica glass particles are commercially available such as from Mo Sci Corp. Generally, however, spherically shaped particles of materials such as glass and of glass-ceramic may be formed by flame spheroidization of fibers of those materials as the fibers are drawn from a melt to form molten droplets.

To illustrate, fibers of desired diameter are first drawn from a melt to achieve a fiber diameter of about 0.5 mm to about 2.0 mm. The fibers then are fed through a flame spheroidization tower to form discrete spherically shaped particles of desired size. Flame spheroidization is illustrated by reference to FIG. 1.

As shown in FIG. 1, tower 1 includes heating section 5 and cooling section 10. Fiber of a desired material such as glass fiber or glass ceramic fiber is fed into heating section 5 where it is melted to form droplets that fall through cooling section 10 to form spherically shaped particles. The rate at which the fiber is fed into heating section 5 may be varied according to the temperature-dependent viscosity of the melt of the material employed during fiber melting to achieve droplet formation. Typically, fiber may be fed into heating section 5 at a rate of about 0.5 cm/sec to about 1.5 cm/sec.

Cooling section 10 includes hot zone 15 and cooling zone 20. The relative lengths and temperatures of hot zone 15 and cooling zone 20 may vary according to the temperature-dependent viscosity and surface tension of the droplets and the atmosphere in tower 1. Typically, hot zone 15 forms about 10% to about 15% of cooling section 10, remainder-cooling zone 20.

Heating section 5 may employ heat sources 25 such as oxy-acetylene torches, propane torches and methane torches. The atmosphere within heating section 5 may be varied to control surface tension and droplet formation. Atmospheric control may be achieved through control of combustion stoichiometry and/or injection of various chemical species in gas or liquid form into the combustion atmosphere as desired.

Hot zone 15 and cooling zone 20 of cooling section 10 may employ upward and/tangential airflow to suspend the droplets and to generate controlled cooling rates and degree of spheroidization. The atmospheres in hot zone 15 and cooling zone 20 may vary. Spherically shaped particles produced are collected such as in a collection basin at the bottom of tower 1. The particles then may be sieved into desired fractions. The collected particles, as well as aggregates of the collected particles, then may be subjected to ion exchange such as single ion exchange and multiple ion exchange.

Ion Exchange

Generally, ion exchange entails treating particles to one or more molten salts at a temperature and for a time period sufficient to generate a desired stress state such as a compressive stress state in the near surface regions of the particle. While particles for use in ion exchange may be generally spherical in shape, that geometry is not essential as they may be in any form. The particles such as glass particles accordingly may be of any shape for use as proppants, for example, they may be spherical, ellipsoidal, cubical, cylindrical, prismatic or take a cross-sectional shape of a hexagonal or octagonal shapes, or any other shape including that of regular or irregular pellets, fibers, flakes, ribbons, beads, shavings, platelets and the like. Preferably, the glass particles are spherical.

Ion exchange also may be employed to generate a desired stress profile through a thickness of the particle. The composition of the molten salts, the temperature of the salts, as well as the time period of treatment may vary according to the composition of the particle subjected to ion-exchange. Generally, the composition of the salt is selected to provide one or more ions such as an alkaline earth ions or a mixture of alkaline earth ions, an alkali ion or a mixture of alkali ions that have a size different from ions present in the particle. For example, where soda-lime-silica glass particles are employed, typical molten salt compositions that may be employed in ion exchange include but are not limited to alkali salts such as $KNO_3$, $NaNO_3$, $LiNO_3$ and mixtures thereof.

The composition of the molten salt employed in a single ion-exchange process may be varied to achieve a desired residual stress state in the ion-exchanged particles. For example, $KNO_3$ may be used to substitute larger $K^{1+}$ ions for smaller $Na^{1+}$ ions to generate compressive residual stress in the ion-exchanged particles. Other nitrate salts that may be used to achieve a desired residual stress state in the ion-exchanged particles include nitrates such as $Be(NO_3)_2$, $Mg(NO_3)_2$, $Sr(NO_3)_2$, $Ba(NO_3)_2$ and mixtures thereof as well as mixtures of one or more of $Be(NO_3)_2$, $Mg(NO_3)_2$, $Sr(NO_3)_2$, $Ba(NO_3)_2$ with $KNO_3$. Chloride salts also may be used. Examples of these chloride salts include but are not limited to KCl, NaCl, $BeCl_2$, $MgCl_2$, $SrCl_2$, $BaCl_2$ and mixtures thereof. Mixtures of any one or more of the nitrate salts and chloride salts also may be employed. Examples of these mixtures include but are not limited to KCl—$KNO_3$, $BeCl_2$—$BeNO_3$, $MgCl_2$—$MgNO_3$ and the like. In addition, the temperature of the molten salts employed in ion-exchange, as well as duration of exposure of the particles to the molten salts, may be varied to generate a desired near surface stress state as well as a desired stress profile across a portion of the thickness of the particle or the entire thickness of the particle.

Generally, the temperatures employed in molten salt ion exchange may be varied according to the glass transition temperature of the material undergoing ion exchange. Typically, the temperature of the molten salts employed in ion-exchange is about 350° C. to about 500° C., preferably about 440° C. to about 460° C., more preferably about 450° C. to about 460° C. and the duration of exposure of the particles to the molten salts may vary from about 0.1 hr to about 100 hrs, preferably about 7 hrs to about 24 hrs, more preferably about 15 hrs to about 23 hrs.

Where it is desired to generate a graded stress profile such as a graded stress profile wherein compressive stress is maximum in the near surface region of the particles and lessens across a given thickness of the particles, a multiple step ion exchange such as a two-step ion-exchange process may be employed. In a first ion-exchange step of a two-step ion exchange, particles such as soda-lime-silica glass particles may be subjected to ion exchange with a molten alkali salt such as $KNO_3$ to generate a compressive stress as described above. In a second ion-exchange step, the ion-exchanged particles from the first step are subjected to an ion exchange with a molten salt such as molten salt mixture formed from a mixture of alkali salts such as a mixture of $KNO_3$ and $NaNO_3$.

Mixtures of two or more alkaline earth salts also may be employed in the second step. These mixtures may be binary, ternary and quaternary, preferably binary. Examples of binary mixtures that may be used include but are not limited to binary mixtures such as $Mg(NO_3)_2/Be(NO_3)_2$, $Mg(NO_3)_2/Sr(NO_3)_2$, $Mg(NO_3)_2/Ba(NO_3)_2$. Examples of ternary mixtures that may be employed include but are not limited to Mg $(NO_3)_2/Be(NO_3)_2/Sr(NO_3)_2$ and $Mg(NO_3)_2/Ba(NO_3)_2/Sr(NO_3)_2$. An example of a quaternary mixture that may be employed includes but are not limited to $Mg(NO_3)_2/Be(NO_3)_2/Sr(NO_3)_2/Ba(NO_3)_2$.

When a mixture of salts is employed in the second step, the amounts of the salts in the mixture may vary over a wide range. Specific amounts of salts in the mixture may vary to control the amounts and types of ions exchanged between the particles and the salt mixture to achieve a desired stress state in the ion-exchanged particles. For example, where a mixture of alkali salts such as $KNO_3$ and $NaNO_3$ is employed in second step of a multi-step ion-exchange of soda-lime-silica glass, the amounts of $KNO_3$ and $NaNO_3$ in the mixture may vary from about 50 wt. % $KNO_3$ to about 85 wt. % $KNO_3$, equivalent to a weight ratio of $KNO_3$ to $NaNO_3$ of about 1:1 to about 5.67:1, and from about 55 wt. % $KNO_3$ to about 80 wt. % $KNO_3$, equivalent to a weight ratio of $KNO_3$ to $NaNO_3$ of about 1:22 to about 4:1, preferably about 66 wt. % $KNO_3$ to about 83 wt. % $KNO_3$, equivalent to a weight ratio of $KNO_3$ to $NaNO_3$ of about 1:94 to about 4.88:1, remainder $NaNO_3$, all amounts based on total weight of the salt mixture. The duration time of the second ion-exchange, such as when employed to treat soda-lime-silica glass may be up to about 0.20 hr to about 6 hrs, preferably up to about 0.25 hr to about 3 hrs, more preferably up to about 0.67 hr to about 3 hrs.

Hydrofracturing Pad Compositions

Ion-exchanged particles such as ion-exchanged soda-lime-silica glass particles may be employed as proppants in hydrofracturing pad compositions. The pad compositions may be made by mixing the ion-exchanged particles with base fluids that include water, hydratable polymers, surfactants, buffers, gel-stabilizers and other viscosity-controlling additives to form a fracturing fluid as shown in U.S. Pat. No. 6,767,868, the teachings of which are incorporated by reference in their entirety herein.

The ion-exchanged particles may be employed as proppants in pad compositions in a wide range of amounts. For example, ion-exchanged soda-lime-silica glass particles may be employed in amounts of about 1 lb to about 10 lb of ion-exchanged particles per gallon of fracturing fluid, preferably about 1 lb to about 5 lb of ion-exchanged particles per gallon of fracturing fluid to produce a hydrofracturing pad composition. These amounts may vary to achieve a tailored particle size distribution of proppants in a hydrofracturing pad composition for a specific application.

The invention is further illustrated below by reference to the following, non-limiting examples.

EXAMPLE 1

Single Ion Exchange to Generate Compressive Residual Stress in Soda-Lime-Silica Glass for Use as a Proppant Soda-lime-silica glass cullet from domestic glass recycling that has the composition of 70 wt % $SiO_2$, 12 wt % $Na_2O$, 1 wt % $K_2O$, 4 wt % MgO, 7 wt % CaO, balance $Al_2O_3$ and trace other oxides where all amounts are based on the total wt of the composition, is melted at 900° C. and drawn into 1 mm dia. fiber.

The fiber is passed at the rate of 1 cm/min into heating section 5 of cooling tower 1 where it is melted with oxy-acetylene torch 25. The resulting molten material forms droplets that fall through cooling section 10 to form spherically shaped particles. Cooling sections 10 and 20 vary in temperature from 1450° C. at the top of cooling section 10 to 25° C.

at the bottom of cooling section 20. The spherically shaped particles produced are collected at the bottom of tower 1. The particles have an average diameter of 1 mm. The particles are subjected to a single ion exchange by immersing the particles in molten $KNO_3$ at 450° C. for a duration time of 7 hrs to generate a compressive stress in the surface of the particles.

EXAMPLE 1A

The method of example 1 is employed except that andesite is substituted for the glass cullet.

EXAMPLE 1B

The procedure of example 1 is employed except that basalt is substituted for the glass cullet.

EXAMPLE 1C

The procedure of example 1 is employed except that rhyolite is substituted for the glass cullet.

EXAMPLE 2

Multiple Stage Ion Exchange of Soda-lime-silica Glass to Produce Particles for Use as a Proppant The procedure and glass particle composition of Example 1 is employed to generate $K^{1+}$ ion-exchanged particles that have a compressive stress state in the surface of the particle. The $K^{1+}$ ion-exchanged particles then are subjected to a second ion-exchange by use of a molten salt mixture that has a molar ratio of 1.66:1 of $KNO_3$:$NaNO_3$, equivalent to a weight ratio of $KNO_3$:$NaNO_3$ of about 2:1. The temperature of the salt mixture is 400° C. and the ion-exchange duration time is 15 minutes.

EXAMPLE 3

Pad Composition that Utilizes the Ion-exchanged Particles of Example 1

1 gal of water and 0.1 wt. % guar gum based on the weight of the water are blended to form a fracturing fluid. One pound of the ion-exchanged particles of example 1 are mixed with the fracturing fluid to form a mixture. Then, 0.001 vol % of zirconium triethanol amine chelating agent based on the volume of the fracturing fluid is added to the proppant composition to form a hydrofracing pad composition.

EXAMPLE 4

The process of example 3 is employed except that the ion-exchanged particles of example 2 are employed.
Evaluation The characteristic strength and fracture behavior of the ion-exchanged particles is evaluated by loading the particles to failure under diametrical compression. Diametrical compression is performed by placement of a single particle between two non-compliant, silicon carbide anvils. The anvils are secured to the upper and lower platens of an Instron Model 4202 load frame fitted with a 1000N load cell. The upper anvil is lowered and stopped just before making contact with the spherical particle.

The diametrical compression test then is started through a computer control interface. The anvil is lowered at a crosshead speed of 0.127 mm/min. The load is recorded as a function of extension of the crosshead. This test reaches completion when catastrophic failure of the ion-exchanged particle occurred.

The fracture load and diameter of the ion-exchanged particle are used to determine the tensile strength of the particle at failure using Equation 1:

$$\sigma_f = 0.9(F_0/d^2) \quad \text{(Eqn. 1)}$$

where $F_0$ is the load at failure and d is the particle diameter at the time of failure. The test is repeated on a minimum of 40 individual ion-exchanged particles to generate a distribution of strengths.

Weibull statistical analysis is used to determine the characteristic failure strength and strength variability of the ion-exchanged particles. The strength distributions are plotted in Weibull fashion, as described by Equation 2 that relates the cumulative failure probability (F) to the fracture stress ($\sigma_f$), the Weibull modulus (m), and the characteristic strength ($\sigma_\theta$):

$$\ln(\ln(1/(1-F))) = m^*\ln(\sigma_f) - m^*\ln(\sigma_\theta) \quad \text{Eqn. 2.}$$

Weibull plots are then fitted with trend lines generated by a maximum likelihood estimator (MLE), which is an iterative calculation that places less weight in outlying data points at low strengths than the least squares estimator. The characteristic failure strength is defined as the stress at which $\ln(\ln(1/(1-F))) = 0$. The Weibull modulus is determined from the slope of the distribution.

The improvement in properties relative to nonexchanged soda-lime-silica glass proppants of the same size is presented in Table 1. As shown in Table 1, a significant increase in strength and strength uniformity is achieved by ion-exchange processing of the glass particles, and indeed to levels surpassing commercial sintered bauxite proppants (such as Carbo HSP) of similar size fraction.

TABLE 1

Comparison of non-exchanged, single ion-exchanged and multiple ion-exchanged particles in diametrical compression.

| Ex. | Sample Name | Characteristic Failure Strength (MPa) | Weibull Modulus |
|---|---|---|---|
|  | Untreated soda-lime-silica glass | 235.4 | 2.4 |
| 1 | Single ion-exchange | 349.5 | 4.1 |
| 2 | Multiple ion-exchange | 324.0 | 7.8 |
|  | Carbo HSP[1] (12/18) | 286 | 2.9 |

The ion-exchanged spherical glass particles of Example 1 and Example 2 that measure 1 mm diameter fracture into fragments predominately larger than 1 mm. Characteristic fragments of the ion-exchanged particles of example 2 are shown in FIG. 2.

Figure 2:
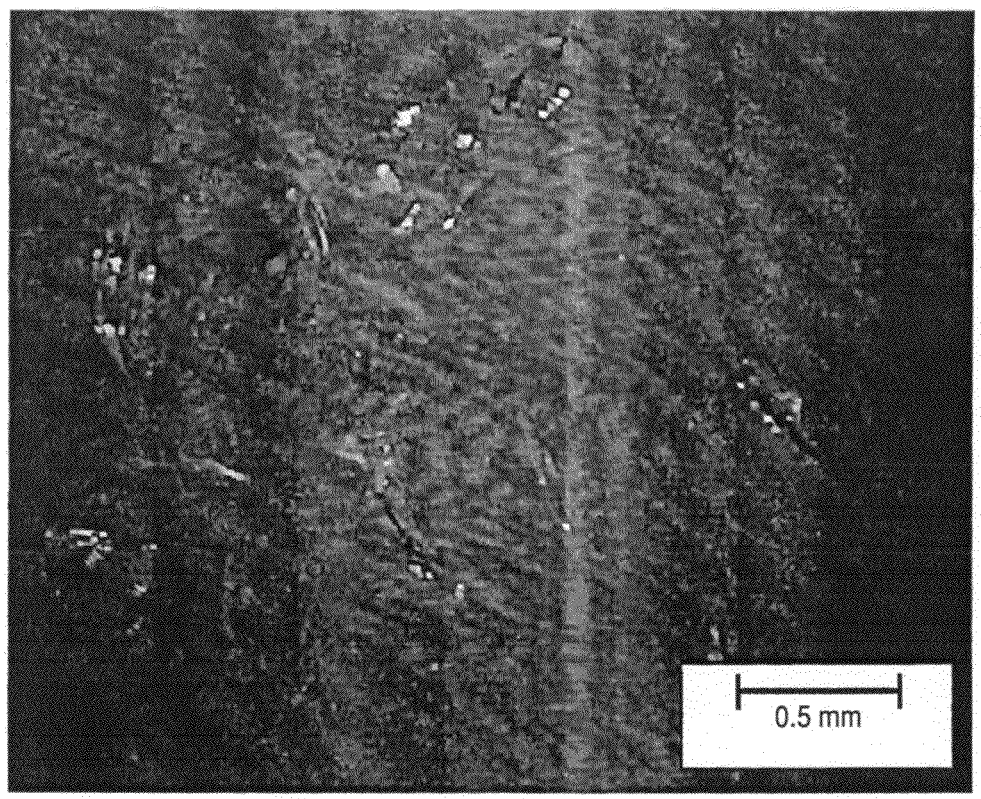
FIG. 2 shows fragmentation distribution of fractured, ion-exchanged glass spheres where large fragments (0.5 mm to 1 mm in longest dimension) remain after diametral compressive strength testing of an individual ion-exchanged glass sphere.
Figure 3:
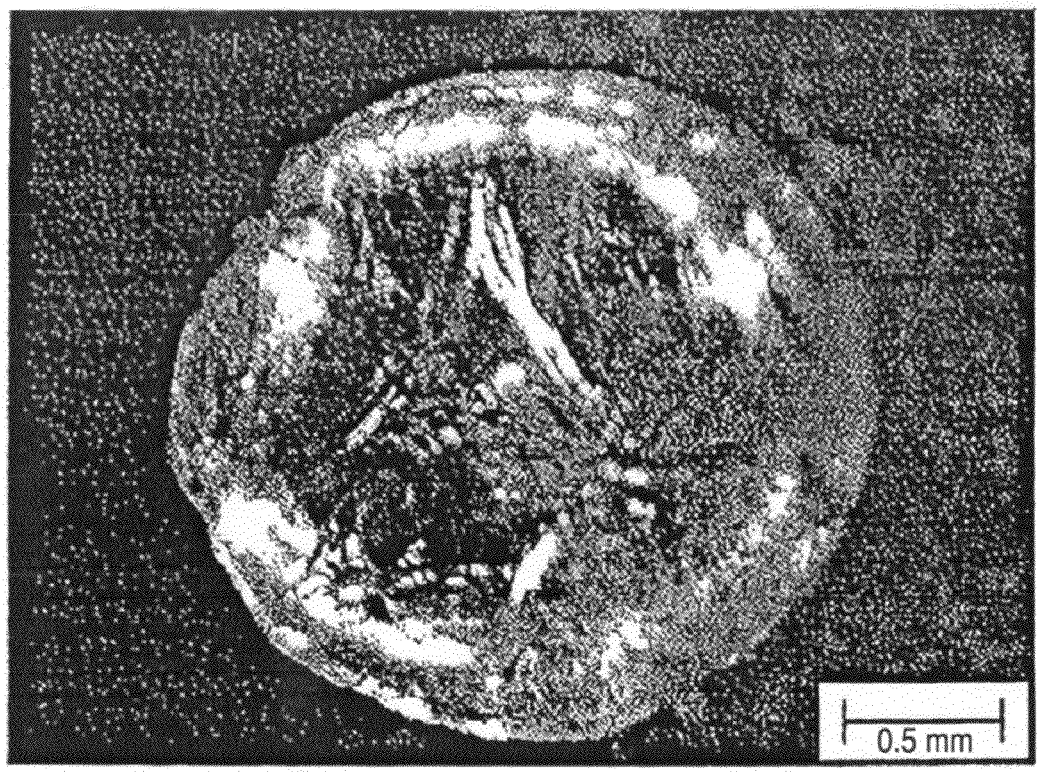
FIG. 3 shows fracture propagation of ion-exchanged particles where fracture originated from at least three surface cracks and propagated to the center at failure.

The large fragments shown in FIG. 2 advantageously may enable lower incidences of blinding of packed particle beds. The ion-exchanged glass particles of Example 1 and Example 2 are subjected to the American Petroleum Institute (API60) test to determine the amount of fines created when a packed bed of ion-exchanged particles is caused to fail under a controlled multiaxial load.

The API60 test defines "fines" as fragments that pass through the lower sieve of the original sieve fraction of the particle bed. This characterizes any failure resulting in a fragment of smaller relative size to the original particle as a "fine". Results are shown in Table 2.

TABLE 2

| Ex. | Sample Name | Failure Pressure | % Fines (per API 60 Standard) | % Fines (<150 μm) |
|---|---|---|---|---|
|  | Untreated soda-lime-silica glass | 5000 PSI | 17 | 7 |
| 1 | Single ion-exchange | 7500 PSI | 18 | 11 |
| 2 | Multiple ion-exchange | 7500 PSI | 22 | 9 |

Table 2 shows that single and multiple ion-exchanged particles of Examples 1 and Example 2 have failure pressures 50% greater than untreated glass particles of the same composition. When the percentage of small fragments is compared with the API60 defined fines in Table 2, it is apparent that the multiple-ion-exchanged particles exhibit higher percentage of API-defined fines, but advantageously with a considerably lower percentage of fines that have a diameter of less than 150 microns. The permeability of a packed bed of ion-exchanged particles therefore may be considerably greater than untreated particles.

Un-treated spherically shaped glass particles, as well as ion-exchanged spherically shaped glass particles of Example 1 and Example 2, also are subjected to the American Petroleum Institute API 61 test to determine the conductivity (a measure of permeability) of a loaded bed of the ion-exchanged particles under conditions where an aqueous 2% KCl solution is forced through the interstitial volume of the particles under an applied pressure of up to 3000 PSI. The API 61 test defines conductivity (md-ft) as the permeability in millidarcies times the width in feet of the packed bed particles through which a hydrofracturing fluid is forced through.

Figure 4:
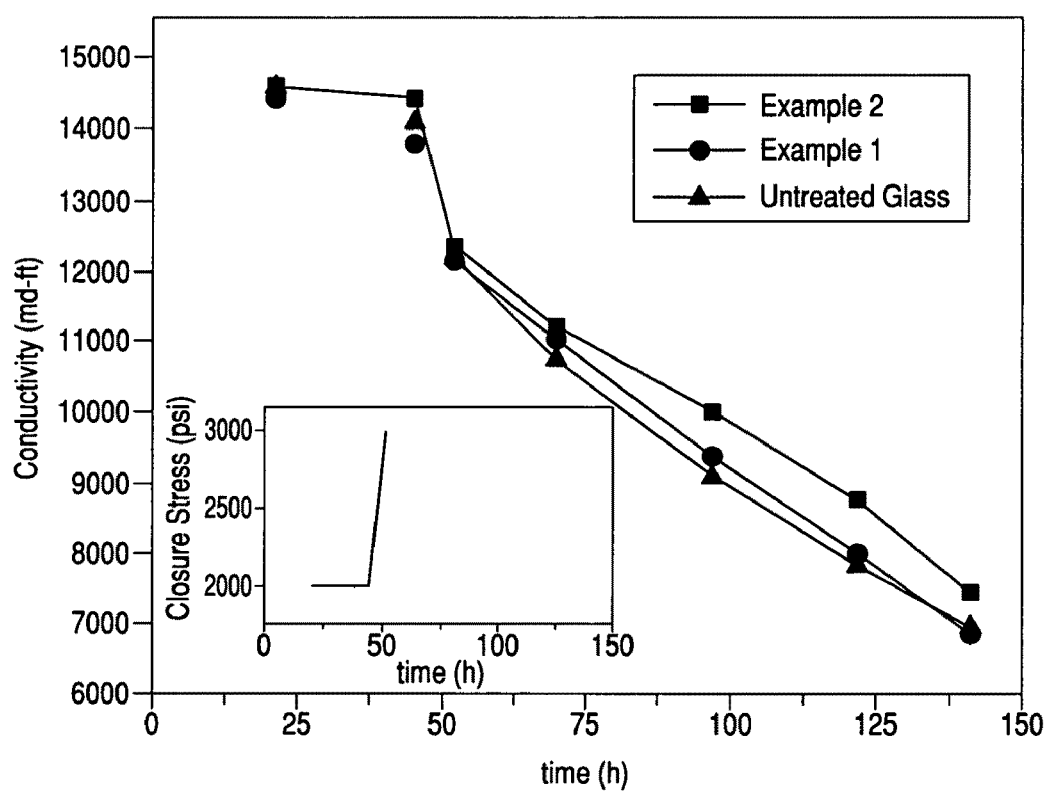
FIG. 4 shows the conductivity of glass proppants as determined by the American Petroleum Institute API 61 test for untreated, single- (Example 1), and multiple ion-exchanged (Example 2) glass spheres.

FIG. 4 shows the improvement in conductivity that is achieved through use of ion-exchanged glass proppants as determined by the API 61 test. Single ion-exchanged particles show improvement at the higher closure stress of 3000 PSI. Over time, the conductivity decreases to a value similar to untreated glass particles.

The multiple ion-exchanged particles of Example 2 exhibit improvement in conductivity compared to untreated glass particles as well as to the ion-exchanged particles of Example 1, both initially and over an extended time period.

The invention claimed is:

1. A proppant having reduced generation of fines during failure comprising a particle selected from the group consisting of soda-lime-silica glass particles, glass-forming alumino silicate particles and mixtures thereof, the particle having a compressive stress state in the near surface region of the particle wherein the compressive stress state is formed by molten salt ion exchange between the particle and a molten salt selected from the group consisting of alkali salts, alkaline earth salts and mixtures thereof.

2. The proppant of claim 1 wherein the soda-lime-silica glass particles further comprise alkali oxides selected from the group consisting of $Li_2O$ and $K_2O$ and mixtures thereof.

3. The proppant of claim 2 wherein the particles have a spherical shape.

4. The proppant of claim 3 wherein the compressive stress state is maximum in the near surface region of the particles and lessens across a desired thickness of the particles.

5. The proppant of claim 1 wherein the alumino silicate particles are selected from the group consisting of andesite, rhyolite, basalt and mixtures thereof.

6. A pad composition comprising the proppant of claim 1.

7. A method of producing particles suitable for use as a proppant having reduced generation of fines during failure comprising,
treating particles to a molten salt at an elevated temperature for a time period to cause molten salt ion exchange between the molten salt and the particles to impart a desired residual stress state in the near surface region of particles,
wherein the particles are selected from the group consisting of glass particles, glass-based particles and glass-forming aluminosilicate particles and wherein the salt is selected from the group consisting of alkali salts, alkaline earth salts and mixtures thereof.

8. The method of claim 7 wherein the glass particles are soda-lime-silica glass particles.

9. The method of claim 8 wherein the molten salt ion exchange is a single ion exchange and the particles are spherical.

10. The method of claim 9 wherein the salt is an alkaline earth salt selected from the group consisting of $MgCl_2$, $SrCl_2$, $BaCl_2$, $Be(NO_3)_2$, $Mg(NO_3)_2$, $Sr(NO_3)_2$, $Ba(NO_3)_2$, $BeCl_2$, and mixtures thereof.

11. The method of claim 9 wherein the salt is an alkali salt selected from group consisting of KCl, NaCl, $KNO_3$, $NaNO_3$, $LiNO_3$ and mixtures thereof.

12. The method of claim 9 wherein the temperature is about 350° C. to about 500° C.

13. The method of claim 7 wherein the molten salt is $KNO_3$, the temperature is about 450° C. and the time period is about 7 hrs.

14. A method of producing particles suitable for use as a proppant having reduced generation of fines during failure comprising,
treating particles to a first molten salt at a first elevated temperature for a first time period to cause ion exchange between the molten salt and the particles to produce first exchanged particles having a desired residual stress state in the near surface region of the first exchanged particles wherein the particles are selected from the group consisting of glass particles, glass-based particles and glass-forming aluminosilicate particles, and
treating the first exchanged particles to a mixture of molten salts for a second time period to generate second exchanged particles that have a graded stress profile a across a given thickness of the particles.

15. The method of claim 14 wherein the glass particles are soda-lime-silica glass particles.

16. The method of claim 15 wherein the mixture of salts is selected from the group of mixtures of alkali salts, mixtures of alkaline earth salts and mixtures thereof.

17. The method of claim 16 wherein the alkali salts are selected from group consisting of KCl, NaCl, $KNO_3$, $NaNO_3$, $LiNO_3$ and mixtures thereof and the alkaline earth salts are selected from the group consisting of $MgCl_2$, $SrCl_2$, $BaCl_2$, $Be(NO_3)_2$, $BeCl_2$, $Mg(NO_3)_2$, $Sr(NO_3)_2$, $Ba(NO_3)_2$, and mixtures thereof.

18. The method of claim 16 wherein the mixtures of alkali salts are binary mixtures and the mixtures of alkaline earth salts are binary mixtures.

19. The method of claim 15 wherein the particles are spherical.

20. The method of claim 15 wherein the first molten salt is an alkali salt selected from group consisting of KCl, NaCl, $KNO_3$, $NaNO_3$, $LiNO_3$ and mixtures thereof.

21. The method of claim 14 wherein the second exchanged particles compressive stress is maximum in the near surface region of the particles and lessens across a given thickness of the particles.

22. The method of claim 14 wherein the first molten salt is $KNO_3$, the first temperature is about 450° C., the first time period is about 7 hrs, the mixture of salts comprises $KNO_3$ and $NaNO_3$, the second temperature is about 400° C. and the second time period is about 15 minutes.

* * * * *